US010266994B2

(12) United States Patent
McDowell et al.

(10) Patent No.: US 10,266,994 B2
(45) Date of Patent: Apr. 23, 2019

(54) APPARATUS AND METHODS FOR CONNECTING COMPONENTS OF A SUPPORT SURFACE

(71) Applicant: NEWPARK MATS & INTEGRATED SERVICES LLC, The Woodlands, TX (US)

(72) Inventors: James Kerwin McDowell, Lafayette, LA (US); David Jon Tilley, Franklin, LA (US); Ryan Michael Gonsoulin, Saint Martinville, LA (US)

(73) Assignee: Newpark Mats & Integrated Services LLC, The Woodlands, TX (US)

( * ) Notice: Subject to any disclaimer, the term of this patent is extended or adjusted under 35 U.S.C. 154(b) by 0 days.

(21) Appl. No.: 15/259,407

(22) Filed: Sep. 8, 2016

(65) Prior Publication Data

US 2017/0073904 A1    Mar. 16, 2017

Related U.S. Application Data

(60) Provisional application No. 62/216,542, filed on Sep. 10, 2015.

(51) Int. Cl.
| | | |
|---|---|---|
| *F16B 21/02* | (2006.01) | |
| *E01C 9/08* | (2006.01) | |
| *F16B 5/06* | (2006.01) | |
| *F16B 5/10* | (2006.01) | |
| *E01C 5/00* | (2006.01) | |

(52) U.S. Cl.
CPC .............. *E01C 9/08* (2013.01); *E01C 5/005* (2013.01); *F16B 5/0642* (2013.01); *F16B 5/10* (2013.01); *F16B 21/02* (2013.01); *E01C 2201/12* (2013.01)

(58) Field of Classification Search
CPC ...................................................... F16B 21/02
USPC ......................................... 411/349, 549–551
See application file for complete search history.

(56) References Cited

U.S. PATENT DOCUMENTS

| | | | | |
|---|---|---|---|---|
| 1,426,098 A | * | 8/1922 | Pruitt ................... | B25B 31/005 411/368 |
| 1,785,709 A | | 12/1930 | Campau | |
| 2,335,828 A | | 11/1943 | Herget | |
| 2,390,325 A | | 12/1945 | Rapp | |
| 2,403,247 A | * | 7/1946 | Sullivan ................... | F16B 5/02 411/261 |
| 2,416,873 A | * | 3/1947 | Gorfin ....................... | F16B 5/10 126/21 R |
| 2,479,992 A | * | 8/1949 | Woods ...................... | F16B 5/10 411/551 |
| 2,811,765 A | | 11/1957 | Mathews, Jr. et al. | |

(Continued)

FOREIGN PATENT DOCUMENTS

| | | |
|---|---|---|
| DE | 3200555 A1 | 6/1983 |
| EP | 2423046 A2 | 2/2012 |
| EP | 1957807 B1 | 10/2012 |

*Primary Examiner* — Flemming Saether
(74) *Attorney, Agent, or Firm* — E. Randall Smith; E. Randall Smith, PC

(57) ABSTRACT

A locking pin for connecting at least first and second adjacent mats of a support surface includes a body and at least one foot operatively connected to the body and configured to secure the locking pin to the mats. The foot is selectively movable from an unlocked position to at least one locked position and then, while in a locked position, selectively moveable upwardly relative to the body and the first and second mats.

20 Claims, 13 Drawing Sheets

(56) References Cited

U.S. PATENT DOCUMENTS

| | | | |
|---|---|---|---|
| 3,136,017 A | 6/1964 | Preziosi | |
| 3,407,454 A | 10/1968 | Myatt | |
| 3,664,434 A * | 5/1972 | Connor | A01C 5/064 |
| | | | 111/135 |
| 3,747,168 A * | 7/1973 | Snarskis | F16B 5/025 |
| | | | 411/349 |
| 4,047,266 A | 9/1977 | Bisbing | |
| 4,498,827 A | 2/1985 | Mair | |
| 4,591,307 A | 5/1986 | Clive-Smith | |
| 4,604,962 A | 8/1986 | Guibault | |
| 4,801,232 A | 1/1989 | Hempel | |
| 5,123,795 A | 6/1992 | Engel et al. | |
| 5,163,796 A | 11/1992 | Belser | |
| 5,246,322 A | 9/1993 | Salice | |
| 5,346,349 A | 9/1994 | Giovannetti | |
| 5,370,488 A | 12/1994 | Sykes | |
| 5,632,586 A | 5/1997 | Nyholm | |
| 5,779,422 A | 7/1998 | Petignat | |
| 6,261,042 B1 | 7/2001 | Pratt | |
| 6,722,831 B2 | 4/2004 | Rogers et al. | |
| 7,524,154 B2 * | 4/2009 | LaConte | B64D 11/0696 |
| | | | 411/349 |
| 8,388,291 B2 | 3/2013 | Rogers | |
| 8,794,895 B2 * | 8/2014 | Homner | F16B 21/073 |
| | | | 411/549 |
| 9,068,584 B2 | 6/2015 | McDowell | |
| 2002/0147017 A1 | 10/2002 | Li et al. | |
| 2002/0187017 A1 | 12/2002 | Rogers et al. | |
| 2002/0192024 A1 | 12/2002 | Webster et al. | |
| 2004/0223828 A1 | 11/2004 | Lazaruk et al. | |
| 2012/0301244 A1 | 11/2012 | Chiu | |

* cited by examiner

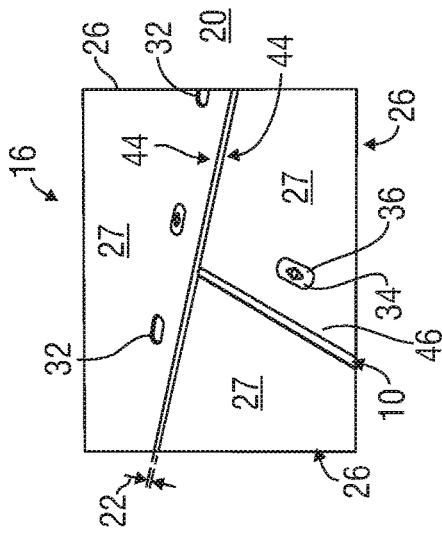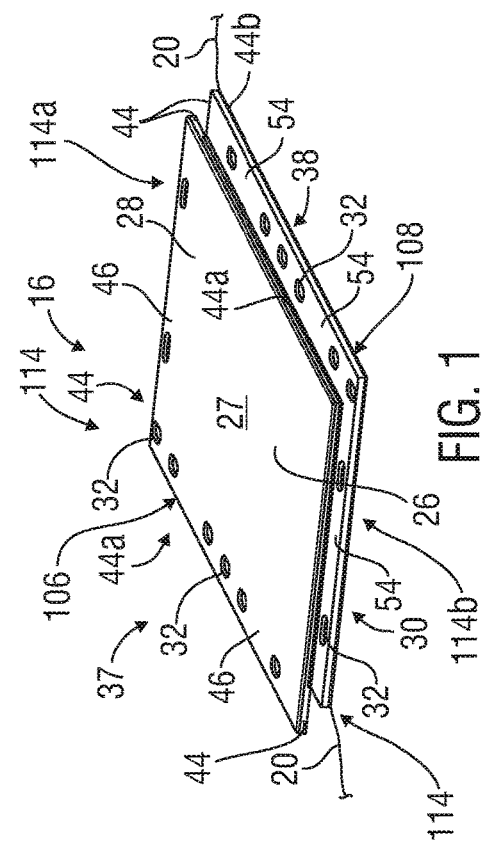

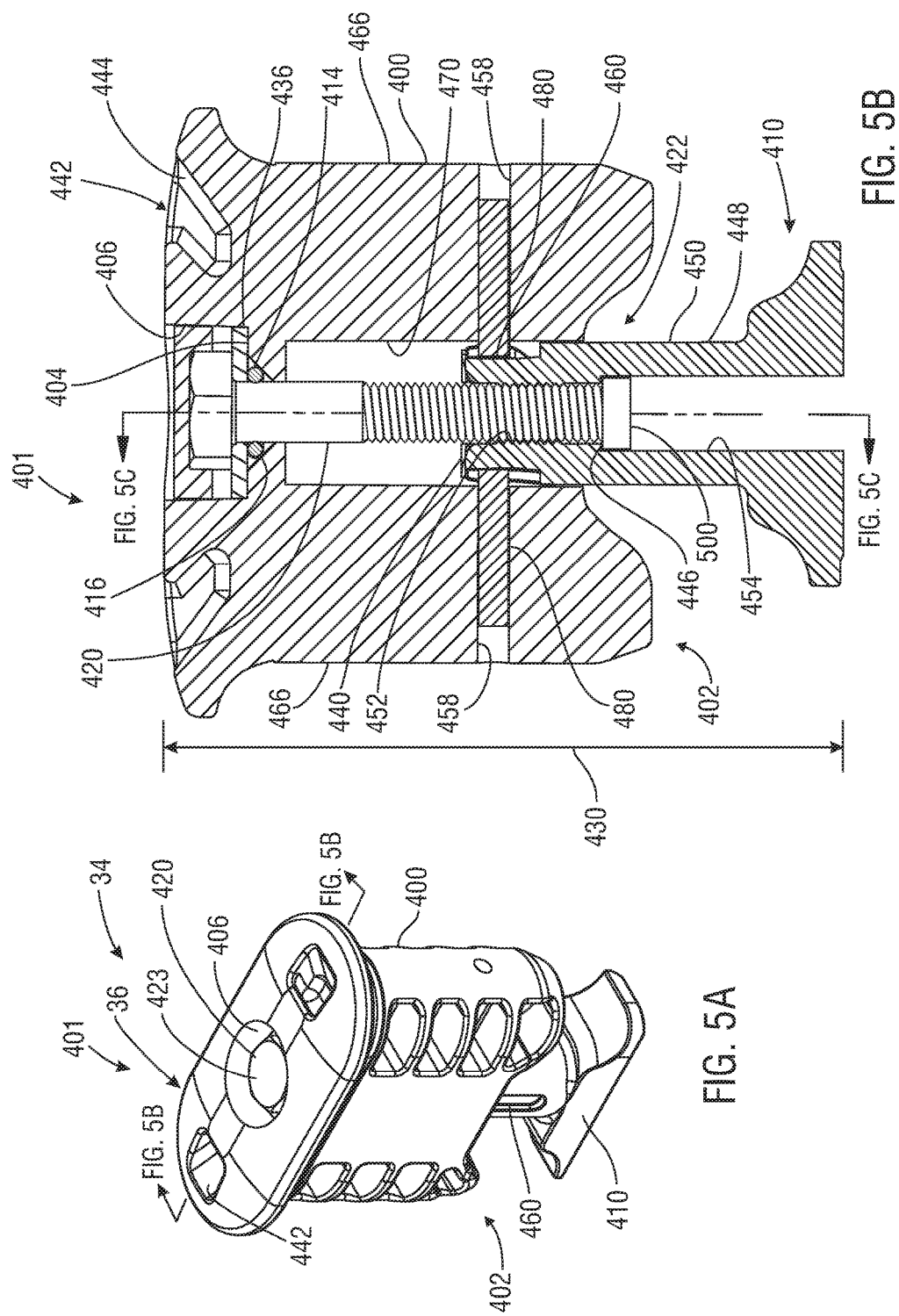

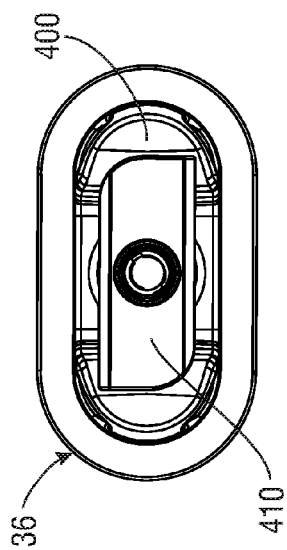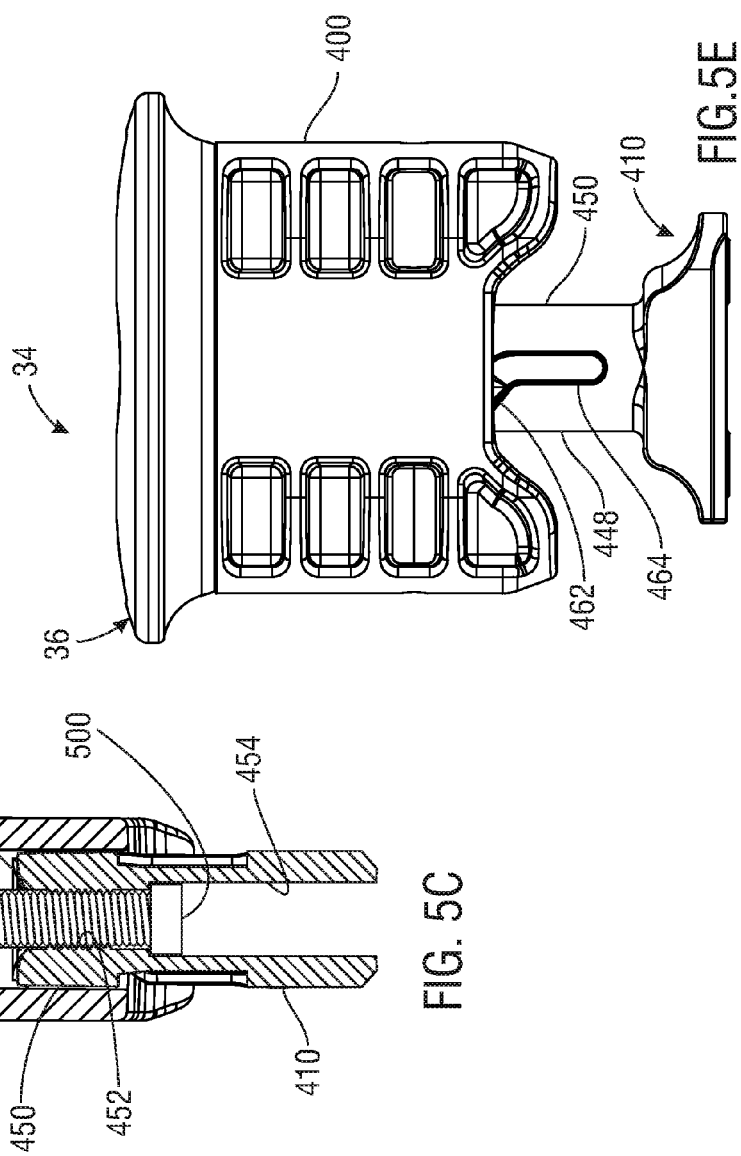

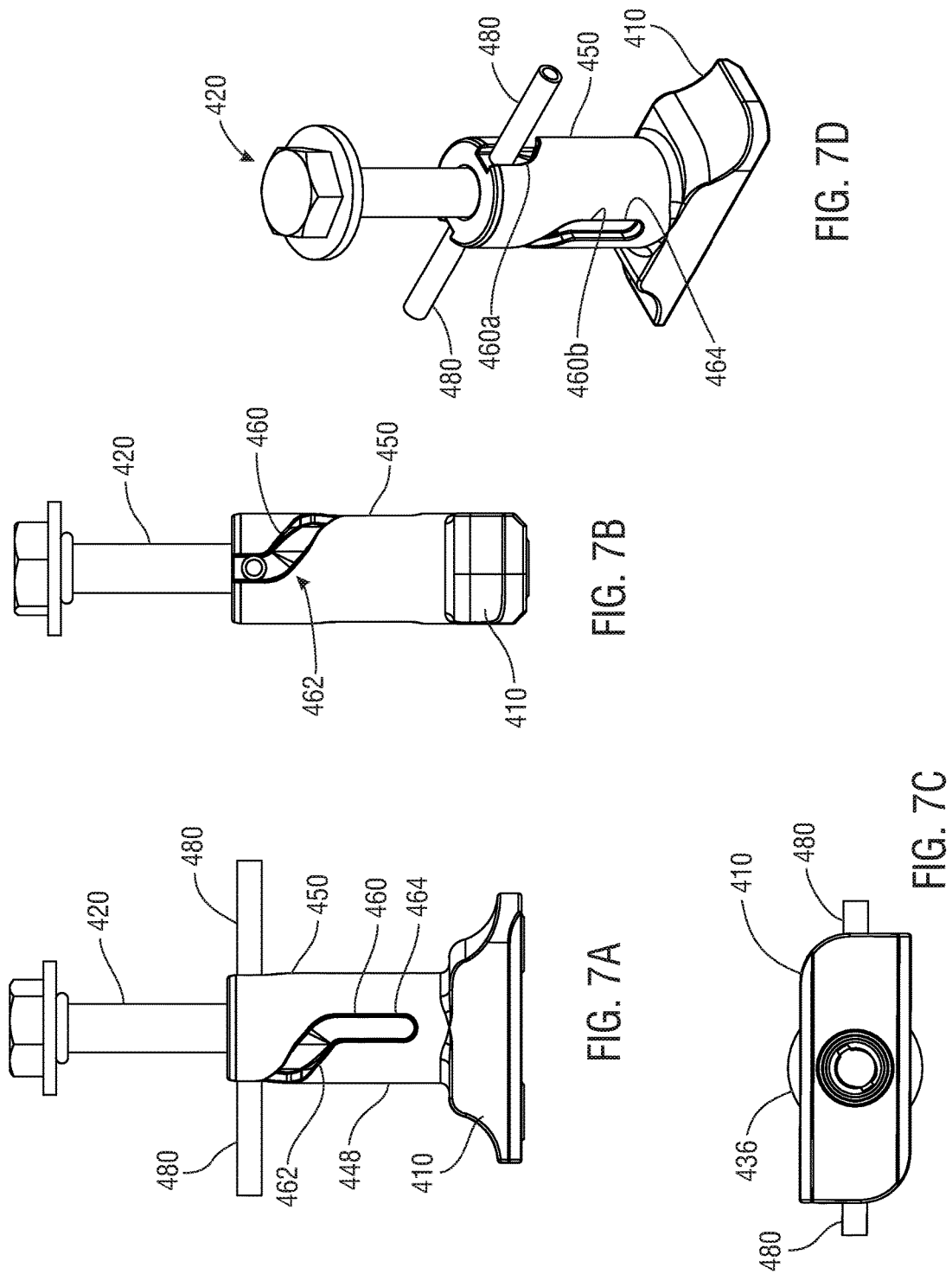

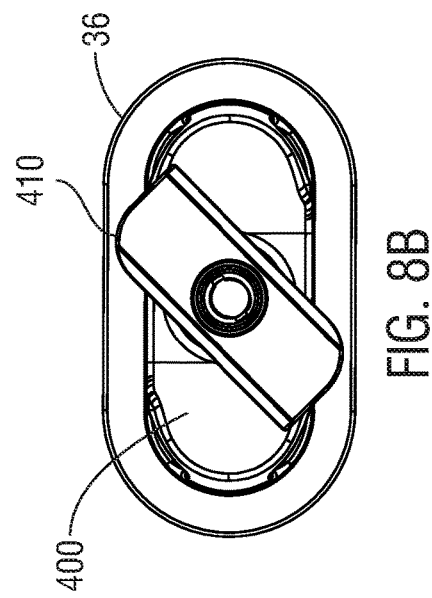
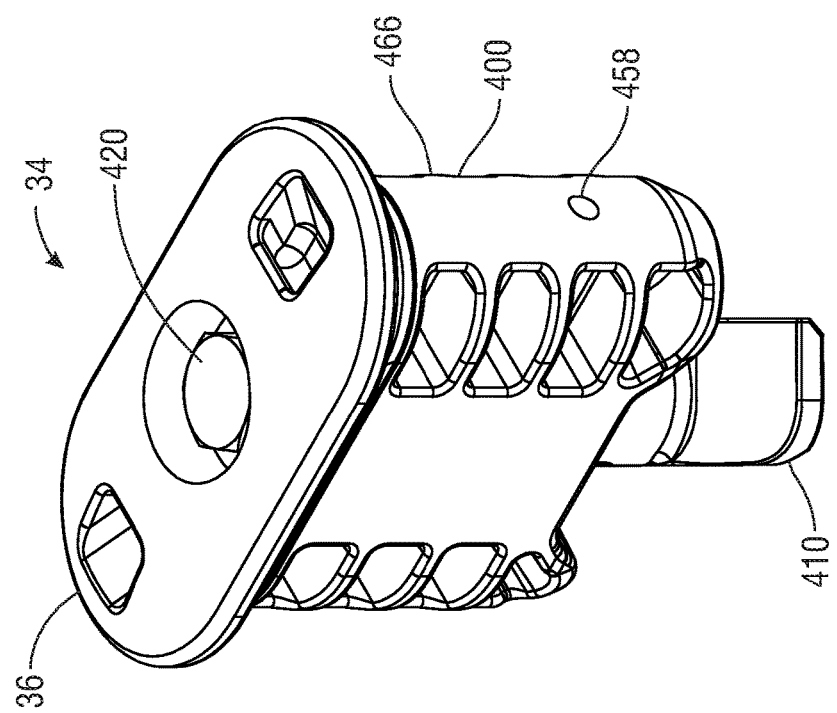

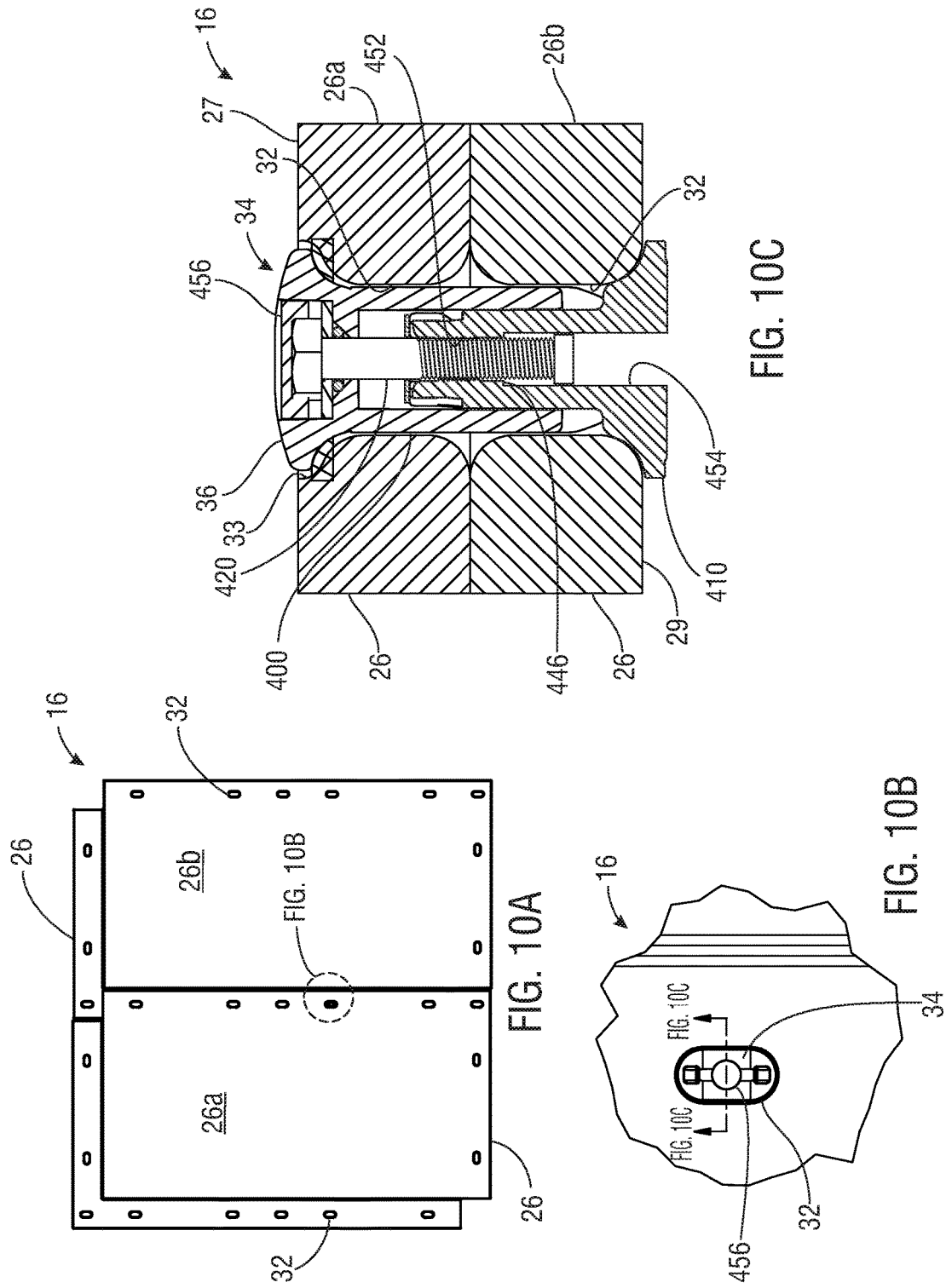

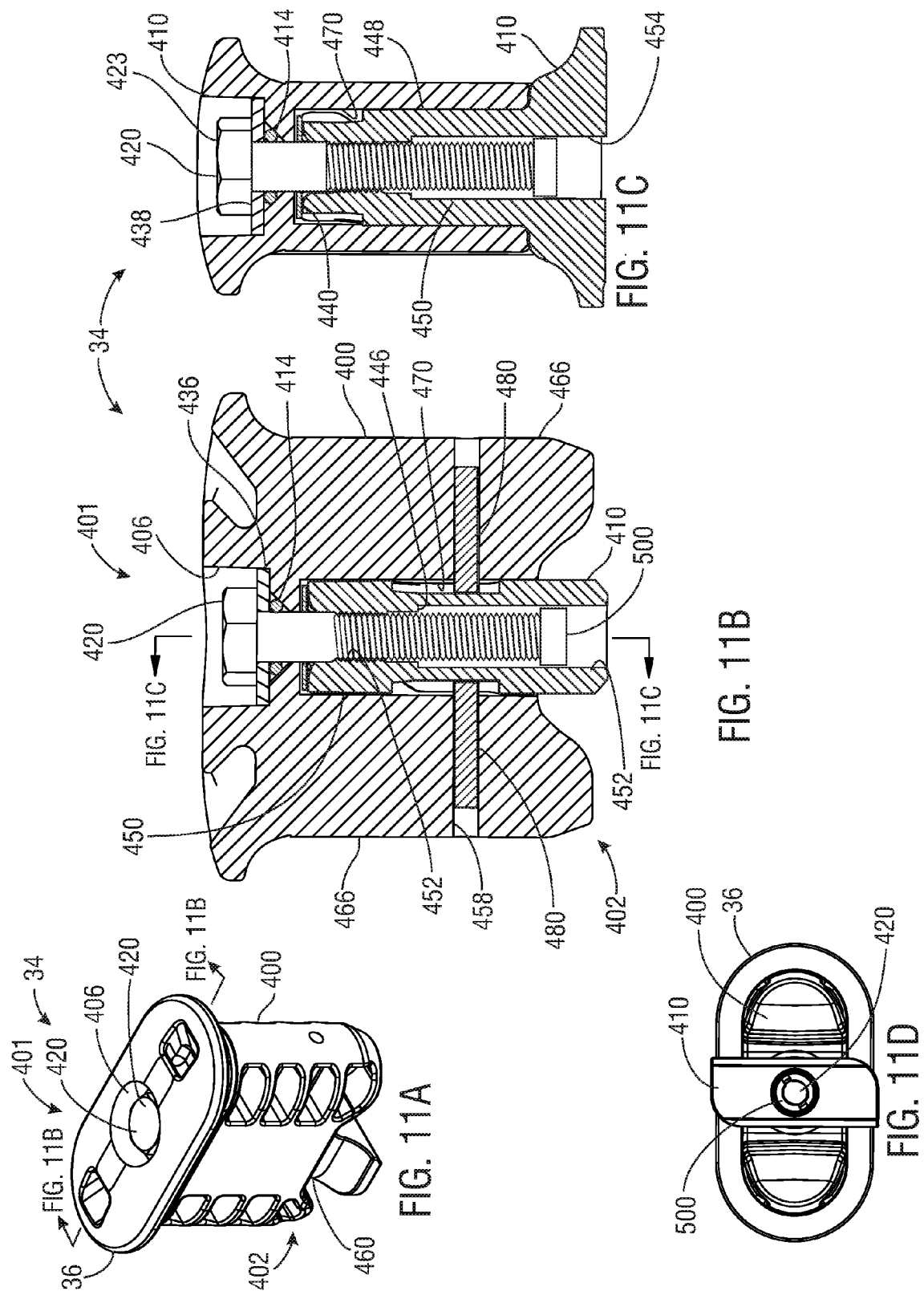

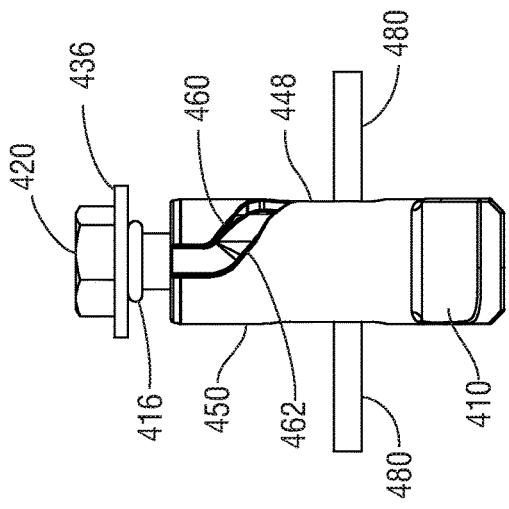
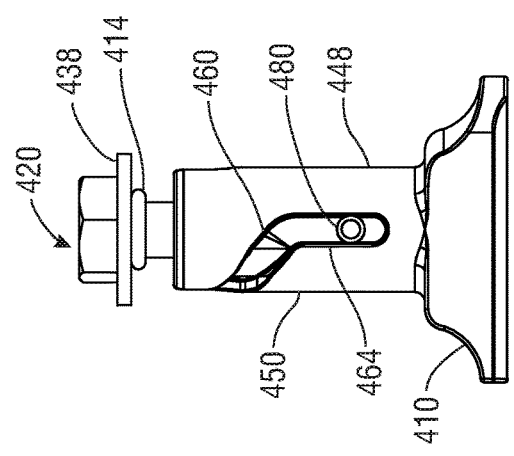
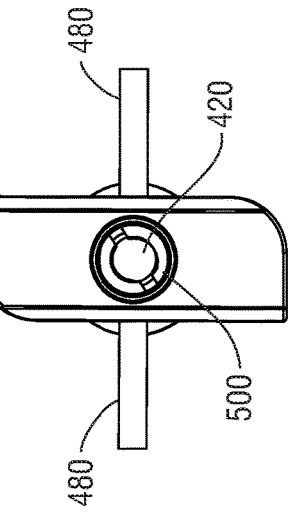
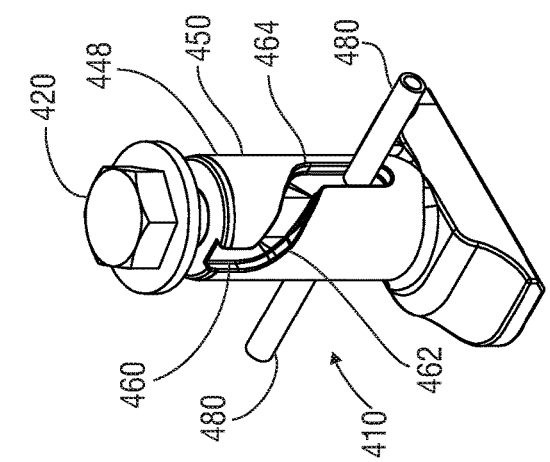

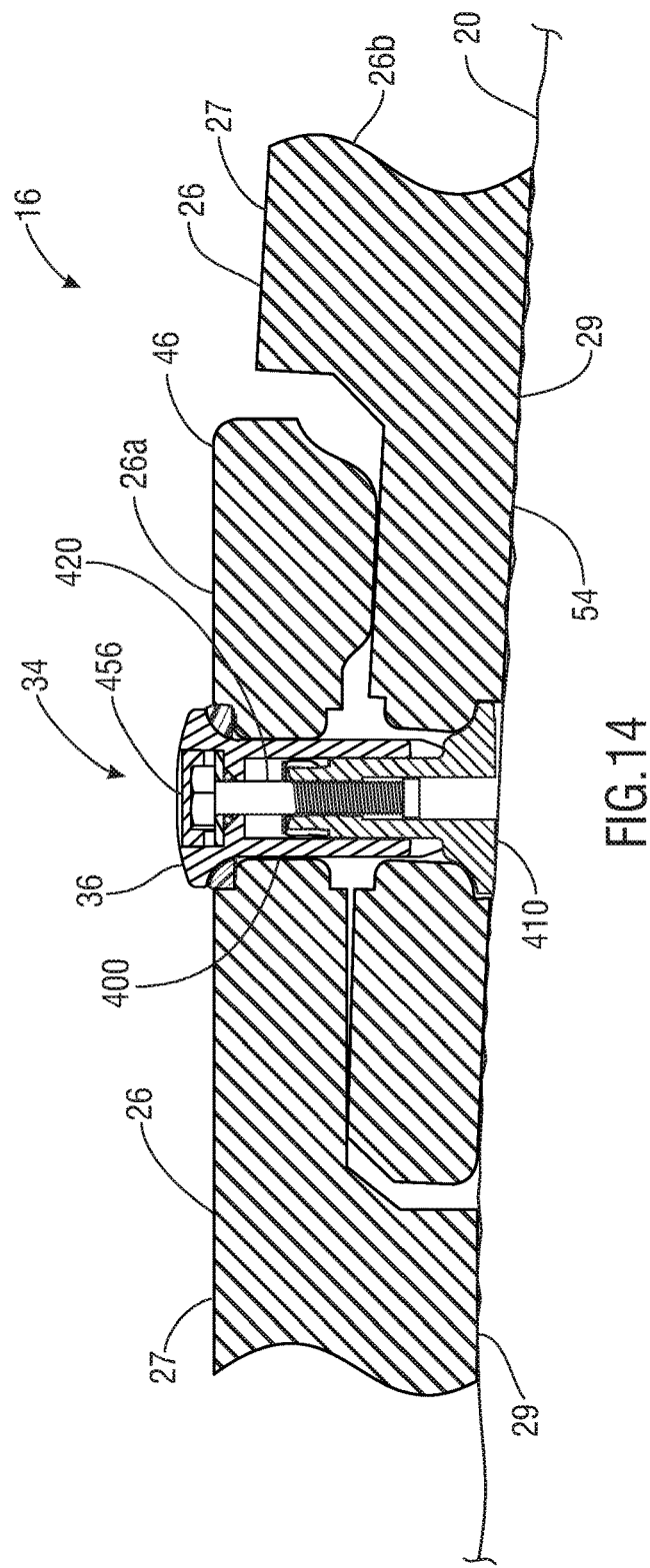

APPARATUS AND METHODS FOR CONNECTING COMPONENTS OF A SUPPORT SURFACE

CROSS REFERENCE TO RELATED APPLICATIONS

This application claims priority to U.S. Provisional Patent Application Ser. No. 62/216,542, filed on Sep. 10, 2015 and entitled "Apparatus for Connecting Mats and/or Other Components and Methods of Assembly and Use Thereof", which is hereby incorporated by reference herein in its entirety.

FIELD OF THE DISCLOSURE

The present disclosure relates to connecting adjacent components of a support surface system.

BACKGROUND

Temporary or semi-permanent support surfaces are used for roadways, remote jobsites, industrial staging areas and the like in an ever-increasing myriad of industries, such as construction, military, oilfield, transportation, disaster response, utilities and entertainment. These support surfaces often include mats and/or other components that are interconnectable by removable connectors, also called locking pins, inserted into aligned connecting holes formed therein.

Many presently known support surfaces and locking pins have one or more disadvantages. For example, various know locking pins are not adjustable to form a tight connection of adjacent mats/other components, not useful in situations where one or the more of the adjacent mats or portions thereof are imperfect, of different thickness, warped, uneven or otherwise not abutting, not useful in other non-ideal situations (e.g. uneven underlying surface), or a combination thereof. For another example, various presently known locking pins do not have the ability to engage misaligned locking pin holes, align them and draw the mats laminar.

It should be understood that the above-described features, capabilities and disadvantages are provided for illustrative purposes only and is not intended to limit the scope or subject matter of this disclosure, the appended claims or those of any related patent application or patent. Thus, none of the appended claims or claims of any related application or patent should be limited by the above discussion or construed to address, include or exclude each or any of the above-cited features, capabilities or disadvantages merely because of the mention thereof herein.

Accordingly, there exists a need for improved systems, articles and methods useful for connecting mats and/or other components having one or more of the attributes or capabilities described or shown in, or as may be apparent from, the other portions of this patent.

BRIEF SUMMARY OF THE DISCLOSURE

In some embodiments, the present disclosure involves locking pin for connecting at least first and second adjacent mats of a support surface. The first mat is configured to at least partially overlap the second mat so that a locking pin hole extending through the first mat aligns at least partially over a locking pin hole extending through the second mat. The locking pin includes a body having a main bore extending therethrough from an upper end to a lower end thereof. The body is configured to be inserted and extend into the aligned locking pin holes of the first and second mats. A foot is operatively connected to the body and positionable at least partially below the lower end of the body and the second mat when the body is inserted into the aligned locking pin holes. The foot is rotatable from at least one unlocked position to at least one locked position. In the locked position(s), the foot is positioned at least partially below the second mat and non-movable up through the aligned locking pin holes. While in one or more locked positions, the foot is selectively moveable upwardly relative to the body and the first and second mats to move the foot, in the locked position, closer to the lower end of the body.

In various embodiments, the present disclosure involves a releasably interconnected support surface for use at an outdoor work-site. The support surface includes at least first and second adjacent, reusable, stepped-configuration mats arranged and adapted to support the weight of people, vehicles and equipment thereupon. The first mat is configured to at least partially overlap the second mat so that a locking pin hole of the first mat aligns over a locking pin hole of the second mat. A plurality of adjustable, releasable locking pins each include a body and a foot associated with the body. The body includes a main bore extending therethrough and is configured to be inserted and extend into the aligned locking pin holes of the first and second mats. The foot is positioned at least partially below the lower end of the body and the second mat when the body is inserted into the aligned locking pin holes of the first and second mats. The foot is moveable from at least one unlocked position to at least one locked position relative to the body (and the first and second mats) after the body is inserted into the aligned locking pin holes. While in one or more locked positions, the foot is selectively moveable upwardly relative to the body and the first and second mats to move the foot, in the at least one locked position, closer to the lower end of the body.

In various embodiments, a method of releasably connecting at least first and second mats with the use of the above-described locking pin involves the first mat at least partially overlapping the second mat so that a locking pin hole in the first mat at least partially aligns over a locking pin hole in the second mat and includes inserting the locking pin into the at least partially aligned locking pin holes of the first and second mats with the at least one foot in an unlocked position. The retractor is rotated to rotate the foot into at least one locked position so that the foot is positioned below the second mat and is not movable up through the respective locking pin holes of the first and second mats. The retractor is rotated to move the foot, in at least one locked position, upwardly relative to the body and the first and second mats to move the foot closer to the lower end of the body while the foot remains in at least one locked position.

Accordingly, the present disclosure includes features and advantages which are believed to enable it to advance support surface technology. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein:

FIG. 1 is a perspective view of an exemplary mat useful in a support surface in accordance with an embodiment of the present disclosure;

FIG. 2 is a top view of a portion of an exemplary support surface useful in accordance with an embodiment of the present disclosure;

FIG. 3A is a perspective view of an exemplary hole in an exemplary mat;

FIG. 3B is a partial cross-sectional view of an exemplary locking pin shown engaged with two mats in accordance with an embodiment of the present disclosure;

FIG. 5A is a perspective view of an exemplary adjustable locking pin shown in a full-reach position with its exemplary foot in a fully-extended and unlocked position in accordance with an embodiment of the present disclosure;

FIG. 5B is a partial cross-section view of the exemplary locking pin of FIG. 5A taken along lines FIG. 5B-FIG. 5B and including an exemplary cover;

FIG. 5C is a partial cross-section view of the exemplary locking pin of FIG. 5B taken along lines FIG. 5C-FIG. 5C;

FIG. 5D is a bottom view of the exemplary locking pin of FIG. 5A;

FIG. 5E is a front view of the exemplary locking pin of FIG. 5A;

FIG. 7A is an isolated front view of the exemplary foot, retractor and guide pins (without the body) of the exemplary locking pin of FIG. 5A showing the exemplary foot in a fully-extended and unlocked position;

FIG. 7B is a side view of the exemplary foot, retractor and guide pins of FIG. 7A;

FIG. 7C is a bottom view of the exemplary foot, retractor and guide pins of FIG. 7A;

FIG. 7D is a perspective view of the exemplary foot, retractor and guide pins of FIG. 7A;

FIG. 8A is a perspective view of the exemplary locking pin of FIG. 5A showing the exemplary foot in an intermediate locked position;

FIG. 8B is a bottom view of the exemplary locking pin of FIG. 8A;

FIG. 10A is a top view of an exemplary support surface having two exemplary mats tightly coupled with the exemplary locking pin of FIG. 5A in a partial-reach position and the exemplary foot thereof in a partial-reach and locked position;

FIG. 10B is an exploded view of the exemplary support surface and exemplary locking pin of FIG. 10A;

FIG. 10C is a partial cross-sectional view of the exemplary support surface and exemplary locking pin of FIG. 10B taken along lines FIG. 10C-FIG. 10C;

FIG. 11A is a perspective view of the exemplary locking pin of FIG. 5A shown in a full-tight position and its exemplary foot in a fully-retracted and locked position;

FIG. 11B is a partial cross-section view of the exemplary locking pin of FIG. 11A taken along lines FIG. 11B-FIG. 11B;

FIG. 11C is a partial cross-section view of the exemplary locking pin of FIG. 11B taken along lines FIG. 11C-FIG. 11C;

FIG. 11D is a bottom view of the exemplary locking pin of FIG. 11A;

FIG. 12A is an isolated perspective view of the exemplary foot, retractor and guide pins (without the body) of the exemplary locking pin of FIG. 5A showing the exemplary foot in an a fully-retracted and locked position;

FIG. 12B is a front view of the exemplary foot, retractor and guide pins of FIG. 12A;

FIG. 12C is a side view of the exemplary foot, retractor and guide pins of FIG. 12A;

FIG. 12D is a bottom view of the exemplary foot, retractor and guide pins of FIG. 12A;

FIG. 14 is a partial cross-sectional view of an exemplary support surface having two exemplary mats (one of which is partially warped and both of which are positioned on a sloped, or uneven, surface) tightly coupled with the exemplary locking pin of FIG. 5A in a partial-reach position and the exemplary foot thereof in a partial-reach and locked position.

DETAILED DESCRIPTION OF PREFERRED EMBODIMENTS

Figure 4A:
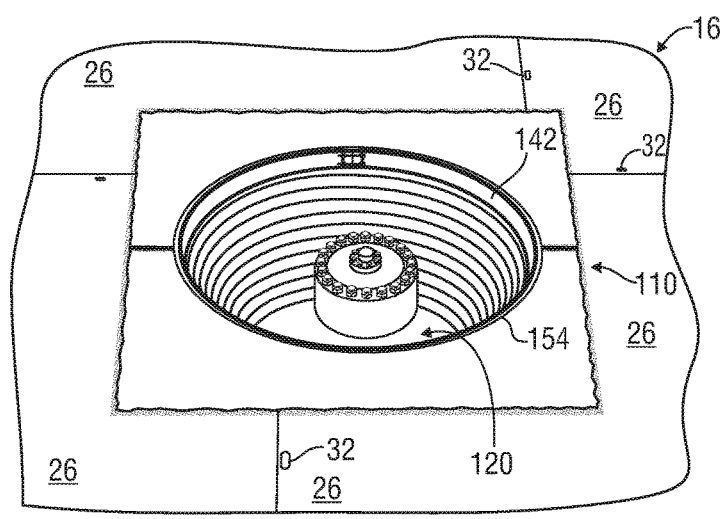
FIG. 4A is a perspective view of a borehole equipped with an embodiment of a borehole edge seal system.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent application or any patent or patent application claiming priority hereto. On the contrary, the intention is to cover all modifications, equivalents and alternatives falling within the spirit and scope of this disclosure or any appended claims. Many changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent application, the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. The terms "coupled", "connected", "engaged" and the like, and variations thereof, as used herein and in the appended claims are intended to mean either an indirect or direct connection or engagement. Thus, if a first device couples to a second device, that connection may be through a direct connection, or through an indirect connection via other devices and connections.

Certain terms are used herein and in the appended claims to refer to particular components. As one skilled in the art will appreciate, different persons may refer to a component by different names. The use of a particular or known term of art as the name of a component herein is not intended to limit that component to only the known or defined meaning of such term (e.g. bar, connector, rod, cover, panel, bolt). Further, this document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Referring initially to FIGS. 1 and 2, the present disclosure relates to, among other things, locking pins 34 useful for connecting components, such as adjacent mats 26, of a support surface 16. As used herein, the terms "mat" and variations thereof means and includes a mat, panel, sheet or other component of a support surface. The locking pin 34 may have any suitable form, configuration, construction and operation, so long as it includes one or more of the features or advantages described or shown in, or as may be apparent from, this patent application.

In the embodiments of FIGS. 1 and 2, an exemplary support surface 16 having at least one load-supporting mat 26 configured to be deployed on or near the ground 20 is shown. As used herein, the term "ground" and variations thereof mean the earth's surface, and/or one or more other surfaces, structures or areas proximate to or associated with the earth's surface. The illustrated support surface 16 includes at least two interconnected adjacent mats 26. The type, configuration, construction, components and form of support surface 16 and mats 26 are not limiting upon present disclosure and the appended claims, unless and only to the extent as may be expressly recited in a particular claim and only for that claim and its dependent claims. Moreover, the locking pins 34 may be used with other components. Thus, any suitable or desired support surface 16, mats 26 and/or other component may be used with the locking pins 34. In the present embodiment, the support surface 16 and each mat 26 are reusable and capable of supporting the weight of vehicles, equipment and/or other structures thereupon. However, other embodiments may involve the use of a support surface 16 and/or mats 26 that are not reusable and/or capable of supporting the weight of vehicles, equipment and/or other structures thereupon.

If desired, the support surface 16 may be used in connection with any of the components and features described and shown in U.S. Pat. No. 9,132,996 issued on Sep. 15, 2015 to Robertson and entitled "Crane-Mounted Grab Head", U.S. Pat. No. 7,370,452 issued on May 13, 2008 to Rogers and entitled "Mat Assembly for Heavy Equipment Transit and Support", U.S. Pat. No. 9,039,325 issued on May 26, 2015 to McDowell and entitled "Liquid Containment System for Use with Support Surfaces", U.S. patent application Ser. No. 14/720,799, filed on May 24, 2015 and entitled "Liquid Containment System", U.S. patent application Ser. No. 14/336,163, filed on Jul. 21, 2014 and entitled "Apparatus and Methods for Providing Illuminated Signals from a Support Surface", U.S. patent application Ser. No. 14/496,105, filed on Sep. 25, 2014 and entitled "Apparatus & Methods for Electrically Grounding a Load-Supporting Support Surface", U.S. patent application Ser. No. 14/838,064, filed on Aug. 27, 2015 and entitled "Apparatus & Methods for Electrically Grounding a Load-Supporting Support Surface", U.S. patent application Ser. No. 14/852,489, filed on Sep. 13, 2015 and entitled "Methods of Moving at Least One Mat With a Crane-Mounted Grab Head", U.S. patent application Ser. No. 15/132,410, filed on Apr. 19, 2016 and entitled "Apparatus & Methods for Supporting One or More Upright Items from a Support Surface", U.S. Provisional Patent Application Ser. No. 62/382,863, filed on Sep. 2, 2016 and entitled "Apparatus and Methods for Forming an Electrically Grounded Work Surface", each of which has a common Assignee as the present patent application and the contents of which are hereby incorporated by reference herein in their entireties.

The mats 26 may have any suitable form, construction, components, configuration and operation. Some examples of mats 26 which may be used in various embodiments of the present disclosure, and methods of assembly thereof, are shown and described in U.S. Pat. No. 5,653,551 to Seaux, entitled "Mat System for Construction of Roadways and Support Surfaces" and issued on Aug. 5, 1997 and U.S. Pat. No. 6,511,257 to Seaux et al., entitled "Interlocking Mat System for Construction of Load Supporting Surfaces" and issued on Jan. 28, 2003 and U.S. Provisional Patent Application Ser. No. 62/367,327, Entitled "Apparatus, Systems and Methods for Reinforcing a Multi-Panel Load Supporting Mat" and filed on Jul. 27, 2016, each of which has a common Assignee as the present patent application and the contents of which are hereby incorporated by reference herein in their entireties.

Each exemplary mat 26 may be heavy-duty so it is capable of withstanding substantial weight and forces placed thereupon during the use thereof in outdoor (and, in some instances, indoor) environments. In many embodiments, the mats 26 are durable, all-weather and capable of use in particularly harsh outdoor environments and circumstances (e.g. remote oilfield or hydrocarbon production, storage, and/or transportation sites, construction, military, transportation, disaster response, utilities and entertainment sites, etc.). In some embodiments, for example, the mat 26 may weight approximately 1,000 lbs., be designed to withstand up to 600 psi in pure crush pressure placed thereupon, reduced point-to-point ground pressure that may be caused by wheeled and/or tracked vehicles on the mat 26 or a combination thereof. In various embodiments, the mats 26 may be 14'×8' DURA-BASE® mats currently sold by the Assignee of this patent application. However, the present disclosure is not limited to the above exemplary details or use with DURA-BASE® mats.

Still referring to FIGS. 1 and 2, in the illustrated embodiment, each mat 26 is substantially flat, or planar, and has a top, or upper surface, 27, lower, or bottom, surface 29 and four sides 28, 30, 37 and 38. At least one edge 44 (e.g. edge 44a) extends along each side and around a perimeter 114 (e.g. perimeter 114a) of the exemplary mat 26. In this example, the mat 26 is rectangular, formed of two panels 102 (an upper panel 106 and lower panel 108) and has an opposing pair of short sides 28, 30 and an opposing pair of long sides 37, 38. The illustrated mat 26 thus has a first, upper, set of aligned edges 44a extending around an "upper" perimeter 114a (formed around the upper panel 106), and a second, lower, set of aligned edges 44b extending around a "lower" perimeter 114b (formed around the lower panel 108). However, in other embodiments, the mat 26 may be a single unitary item or a combination of more than two component parts, may not be reversible, may have only one, or more than two, perimeters 114, or any desired combination thereof or other configurations.

In this example, the mat 26, although substantially planar, has a stepped-configuration. As used herein, the terms "stepped-configuration" and variations thereof mean the mat 26 has at least one portion that extends at least partially on a different plane than at least one other portion and the planes are at least substantially parallel. Thus, the exemplary first short side 28 and first long side 37 each have an upper lip 46 extending horizontally outwardly therefrom, which will typically be spaced above the ground 20. The illustrated second short side 30 and second long side 38 each have a lower lip 54 extending horizontally outwardly therefrom, and which will typically rest on the ground 20. Thus, in this embodiment, two sets of aligned edges 44a, 44b are formed around the sides 28, 30, 37 and 38.

Referring still to FIGS. 1 & 2, many temporary or semi-permanent support surfaces have holes (cut-outs, orifices, cavities, etc.) 32 formed in them. For example, support surfaces 16 made up of multiple mats, panels and/or other components often include connecting holes 32 formed therein. In some instances, the mats, panels and/or other components include holes (cut-outs, orifices, cavities, etc.) 32 that can be aligned over or under those of adjacent mats/panels/components and through which removable locking pins 34 are inserted for connecting the mats/components together. These sorts of holes 32 are sometimes referred to herein as "locking pin" holes.

In the illustrated example, the respective upper and lower lips 46, 54 of different mats 26 are interconnectable with locking pins 34 releasably securable through corresponding locking pin holes 32 formed therein. The locking pin holes 32 and locking pins 34 may have any suitable form, construction, configuration, components and operation. In this embodiment, the illustrated mats 26 include a plurality of locking pin holes 32, each configured to accept a releasable locking pin 34 therethrough. Each illustrated mat 26 may include, for example, a total of sixteen locking pin holes 32, eight locking pin holes 32 formed in each set of upper and lower lips 46, 54. However, the present disclosure is not limited to use with mats or other support surface components having "locking pin" holes, but can be used with mats or other support surface components having any suitable orifice, opening, hole or cavity formed therein. Thus, as used herein, the terms "hole", "locking pin hole" and variations thereof mean any hole, opening, orifice or cavity formed in a mat, panel or other component of a support surface, having any desired shape, location, configuration and form and suitable for use in connection with a locking pin 34 in accordance with the present disclosure.

The locking pins 34 may, for example, include any one or more of the features and/or uses shown or described in, or as may be otherwise apparent from, U.S. Pat. No. 6,722,831 to Rogers et al., entitled "Fastening Device" and issued on Apr. 20, 2004, U.S. Pat. No. 8,388,291 to Rogers, entitled "Mat Lock Pin" and issued on Mar. 5, 2013, U.S. Pat. No. 9,068,584 to McDowell et al, entitled and "Apparatus & Methods for Connecting Mats" and issued on Jun. 30, 2015, each of which has a common Assignee as the present patent application and the entire contents of which are hereby incorporated by reference herein in its entirety.

In some embodiments, the locking pins 34 may form a fluid-tight seal around, or in, the locking pin holes 32 within which they are engaged, such as the exemplary locking pin 34 illustrated and described in U.S. Pat. No. 9,068,584, U.S. Provisional Patent Application Ser. No. 62/216,542, entitled "Apparatus for Connecting Mats and/or Other Components and Methods of Assembly and Use Thereof" and filed on Sep. 10, 2015 and U.S. patent application Ser. No. 14/752,067 entitled "Adjustable Mat Locking Pin and Methods of Use Thereof" and filed on Jun. 26, 2015, all of which have a common Assignee as the present patent application and the entire contents of which are hereby incorporated by reference herein in their entireties.

Referring to FIGS. 3A & 3B, the illustrated locking pin holes 32 of the mats 26 have a non-circular cross-sectional shape. In this example, the locking pin holes 32 have an oval shape, such as to accept an oval-shaped enlarged head 36 of the illustrated locking pins 34. An oval-shaped recess, or indentation, 33 is formed in the upper and lower surfaces 27, 29 of each exemplary mat 26 around each locking pin hole 32. In this embodiment, the indentation 33 is also oval and configured to at last partially seat the oval-shaped enlarged head 36 of the illustrated locking pin 34.

Figure 4B:
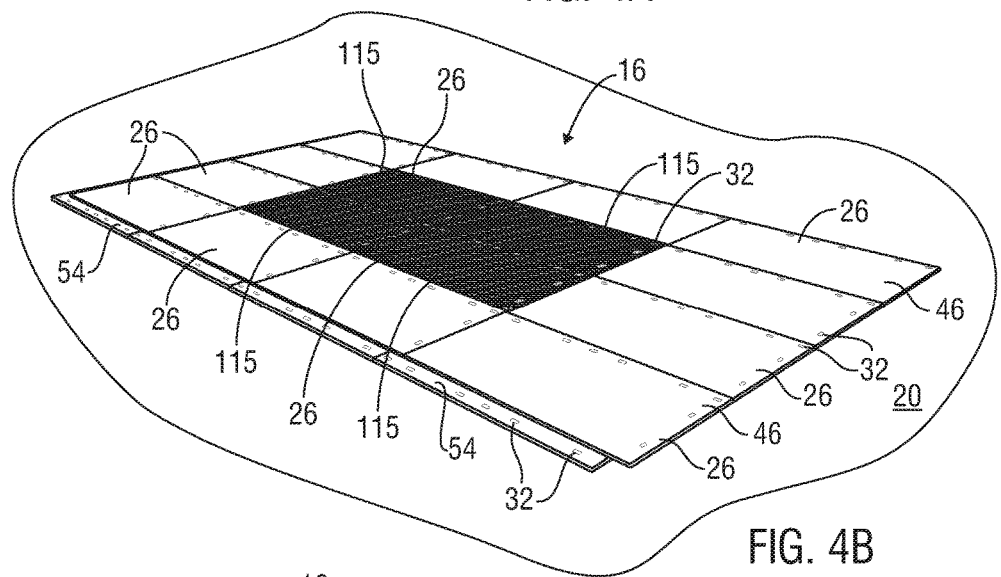
FIG. 4B is a perspective view of an exemplary support surface having multiple mechanically interconnected mats, some of which are equipped with an embodiment of an electrically-conductive cover and are electrically coupled together.
Figure 4C:
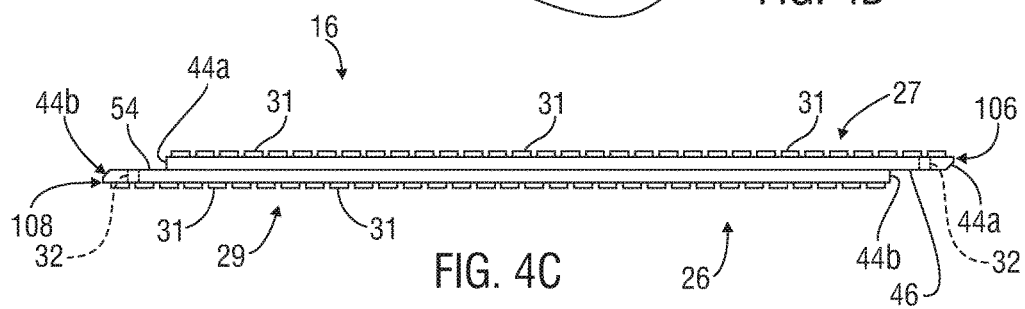
FIG. 4C is a side view of an exemplary mat.

As shown in FIG. 4C, in some embodiments, the upper and lower surfaces 27, 29 of the mat 26 may include raised traction promoting elements, or treads, 31 formed in or extending from the mat 26. However, in some stepped-configuration embodiments, the treads 31 may not be included on the underside of each panel 106, 108 of the mat 26 that extends beyond the other respective panel 106, 108. In other words, in the illustrated mat 26, the upper surface 27 of the mat 26 that forms the lower lip 54 (which is the portion of panel 108 that extends beyond panel 106) is absent the treads 31. Thus, the locking pin holes 32 on the exemplary upper lip 46 are surrounded by treads 31, while the locking pin holes 32 on the illustrated lower lip 54 are not surrounded by treads 31. Of course, when the same mat 26 is turned over, the former lower lip 54 (absent treads 31) becomes an upper lip 46 having treads 31. Some exemplary raised traction promoting elements that may be used on the mats 26 in some embodiments are shown and described in U.S. Pat. No. 6,511,257.

It should be noted, however, that the present disclosure is not limited to use with the above-described or referenced types and configurations of support surfaces 16 and mats 26, or to the disclosures of the above-referenced patents and patent applications. The locking pins 34 of the present disclosure may be used with any other suitable support surfaces, mats or other components.

Referring back to FIG. 2, in some embodiments, a gap 22 may be formed between adjacent edges 44 of adjacent interconnected mats 26 in the support surface 16, and one or more seal members 10 may be included therein. For example, the seal member(s) 10 may provide a liquid-tight seal in the gap 22 between adjacent mats 26 to prevent liquid introduced onto the support surface 16 from seeping or flowing between mats 26 and/or other components and below the support surface 16.

Some embodiments of seal members 10 that may be used in the gaps 22 are disclosed in U.S. Pat. No. 9,212,746 to McDowell, issued on Dec. 15, 2015 and entitled "Apparatus and Methods for Sealing Between Adjacent Components of a Load-Supporting Surface", U.S. patent application Ser. No. 14/948,340, filed on Nov. 22, 2015 and entitled "Method of Sealing Between Adjacent Components of a Load-Supporting Surface With at Least One Closed-Cell Compressible Rubber Seal", U.S. patent application Ser. No. 14/730,938, filed on Jun. 4, 2015 and entitled "Load-Supporting Surface with Actively Connected Gap Seals and Related Apparatus and Methods", and U.S. patent application Ser.

No. 14/733,324, filed on Jun. 8, 2015 and entitled "Load-Supporting Surface with Interfacing Gap Seal Members and Related Apparatus and Methods", all of which have a common Assignee as the present patent application and the entire contents of which are hereby incorporated by reference herein in their entireties.

The support surface 16 may include or be associated with other components, and the seal member(s) 10 may also or instead be used between any combination of mats 26 and other components associated with the support surface 16. Some examples of such additional components that may be useful in connection with support surfaces 16, such as berm members, spacers, drive-over barriers, liquid drain assemblies, etc., are shown and disclosed in U.S. Pat. No. 9,039,325 and U.S. patent application Ser. No. 13/790,916.

In some instances, such as shown in FIG. 4A, the support surface 16 may be used around an underground borehole 120, such as with the use of a borehole edge seal system 110. Various embodiments of exemplary borehole edge seal systems 110 are shown and described in U.S. patent application Ser. No. 14/497,429, entitled "Apparatus and Methods for Sealing Around the Opening to an Underground Borehole" and filed on Sep. 26, 2014 and U.S. patent application Ser. No. 14/666,584 entitled "Apparatus and Methods for Mechanically Coupling a Sealing System Around the Opening to an Underground Borehole" and filed on Mar. 24, 2015, both of which have a common Assignee as the present patent application and the entire contents of which are hereby incorporated by reference herein in their entireties.

In various embodiments, such as shown in FIG. 4B, one or more electrically-conductive covers 115 may be used in connection with the support surface 16. Various embodiments of electrically-conductive covers are shown and described in U.S. patent application Ser. Nos. 14/496,105, 14/838,064 and U.S. Provisional Patent Application Ser. No. 62/382,863. If desired, one or more illuminators (not shown) may be used in connection with the support surface 16. Various embodiments of illuminators are shown and described in U.S. patent application Ser. No. 14/336,163.

Referring again to FIG. 1, in many embodiments, the mat 26 includes at least two panels 102 which are interconnected and form the mat's stepped-configuration (see e.g. FIG. 5C). The panels 102 may have any desired shape and configuration. As used herein, the terms "panel" and variation thereof mean a sheet, section, segment or combination thereof of one or more materials of any desired construction and shape. For example, the illustrated mat 26 includes upper and lower engaged, overlapping, offset, rectangular-shaped panels 106, 108. As used herein, the terms "overlapping" and variations thereof as used in the context of two or more panels 102 mean that one panel 102 rests upon and covers at least part of the other panel 102. The terms "offset" and variations thereof as used in the context of two or more overlapping panels 102 mean that the panels 102 are not perfectly aligned one over the other so that one or more portions of each overlapping panel 102 are aligned over the other panel(s) 102 and one or more other portions of each panel 102 extend beyond the other panel(s) 102.

The exemplary mat 26 is also reversible. In other words, the top 27 and bottom 29 of the illustrated mat 26 are mirror images of one another, so either the top 27 or bottom 29 can be facing up or down. In other embodiments, the mat 26 may include more than two panels 102, each of which has any desired shape (e.g. square or other geometric arrangement) and may not be reversible.

The panels 102 may be constructed of any suitable material and interconnected in any desired manner. Thus, present disclosure is not limited by the material construction and method of interconnecting the panels 102. The exemplary panels 102 are constructed of impermeable material, such as thermoplastic material, and are coupled together by a process known as hot-plate welding. Other example panels 102 may be constructed entirely or partially of rubber, plastic, fiberglass, fiber reinforced plastic, recycled rubber or other material, wood, steel, steel-framed wood, aluminum, or any other desired material or combination thereof and may be interconnected by other forms of welding, mechanical connectors, etc.

In this example, the overlapping, offset panels 102 are also geometrically-aligned so that the outer edges 44a of the mat 26 (e.g. FIG. 1) extending along each respective side of the upper panel 106 are at least substantially parallel to the outer edges 44b of mat 26 extending along the respective corresponding sides of the lower panel 108. As used herein, the terms "geometrically-aligned" as used in the context of two or more overlapping, offset panels 102 mean that that the outer edges extending along each respective side of one panel are at least substantially parallel to the outer edges of the respective corresponding sides of the other panel(s). In other embodiments, the panels 102 may not be geometrically-aligned.

It should be understood that none of the particular embodiments or features described or shown in FIGS. 1-4C, or in the above-referenced patents and patent applications, is required for, or limiting upon, the present disclosure unless and only to the extent as may be explicitly required in a particular claim hereof or in a patent claiming priority hereto and only for such claim and any claims depending therefrom.

Now referring to FIGS. 5A-E, an embodiment of an adjustable locking pin 34 is shown. The illustrated locking pin 34 includes at least one body 400 and at least one foot 410 operatively connected thereto and positioned at least partially below the lower end 402 thereof. The exemplary locking pin 34 may be adjustable relative to one or more associated mats 26 (e.g. FIG. 10C) in any suitable manner. For example, the locking pin 34 may provide a wide reach and/or wide range of locked positions. In this embodiment, the foot 410 is selectively moveable from an unlocked position (e.g. FIG. 5A) into a locked position (e.g. FIG. 9A) and then, while in one or more locked positions, selectively moveable, upwardly in the direction of the body 400 (and also downwardly away from the body 400). If desired, the locking pin 34 may be configured so that the foot 410 has a long distance of (up and down) travel relative to the body 400 while in one or more locked positions. This configuration can provide a wide reach for the locking pin 34 and a large span (or possible number) of locked positions. In FIGS. 5A-E, for example, the locking pin 34 is shown in an initial, or "full-reach", position with a wide maximum reach 430.

The adjustable locking pin 34 may be provided for any desired purpose and offer one or more benefits, depending upon the particular use scenario. For example, the wide reach and span of locked positions of the illustrated locking pin 34 is greater than many prior art mat locking pins and, in many scenarios, allows the user to tighten and hold the associated mats 26 (e.g. FIGS. 10A-C) together to form a tighter fit. In various scenarios, the exemplary locking pin 34 may successfully engage misaligned locking pin holes 32 of the adjacent mats 26, align them and draw the mats 26 laminar. In some scenarios, the exemplary locking pin 34 may reach farther across the width, or thickness, of the overlapping mats 26. In some instances, the long reach of the illustrated locking pin 34 may allow the locking pin 34 to be used where there is variability between the associated mats 26 (e.g. different size, shape, thickness or configuration of mats, imperfect positioning, curling or warping (e.g. FIG. 14) of one or both mats 26). For another example, the longer reach of the exemplary locking pin 34 may accommodate mats 26 having corresponding lips or surfaces around the locking pin hole(s) 32 that are not in full contact, allowing a greater range of use scenarios where mats 26 may be coupled together and enabling the locking pin 34 to better hold the mats 26 together. For yet another example, the wide range of locked positions and/or wide reach of the exemplary locking pin 34 may provide greater flexibility and effectiveness in connecting adjacent mats 26. Other potential benefits may include allowing the user to control and properly align the locking pin 34 and adjust its reach relative to the mats 26 to fit the particular circumstance; assist in preventing or restricting undesirable "play" and/or vertical movement of one mat 26 relative to the other mat(s) 26; assist in providing and maintaining a close interface between the mats 26; maintain a close relationship or tight fit of the mats 26 on an uneven surface (e.g. ground 20, FIG. 14); assist in providing or allowing an at least partial fluid-tight seal at the upper end of the associated locking pin hole 32 of the upper mat 26a (e.g. FIG. 10C) and/or between the mats 26. In some embodiments, if one or both of the connected mats 26 deforms, degrades, shifts or otherwise moves over time or the mats 26 become loose relative to one another, the locking pin 34 may be readjusted to again establish a desired connection and fit between the mats 26.

Referring still to FIGS. 5A-E, the exemplary body 400 and foot 410 may have any suitable form, configuration, construction and operation. In this embodiment, the body 400 includes a main bore 470 extending therethrough from the upper end 401 to the lower end 402 thereof. For example, the main bore 470 may be configured to extend substantially vertically through the center of the body 400. If desired, the head 36 of the locking pin 34 may be formed in the main body 400 and include a recess 406 in communication with the main bore 470 and a seat 404 for seating a retractor 420 (such described below). Also if desired, the head 36 of the illustrated locking pin 34 may include at least one extraction tool receiver 442 configured to receive an extraction tool useful to remove the locking pin 34 from the support surface 16. The extraction tool receiver 442 may have any suitable form, configuration, operation and location. In this example, the extraction tool receiver 442 includes a pair of angularly oriented extractor recesses 444 extending into the head 36 from the upper surface thereof and spaced from the outer edge thereof.

The exemplary body 400 is shaped and configured to be inserted and extend into the aligned locking pin holes 32 of at least first (upper) and second (lower) mats 26a, 26b of a support surface 16 (e.g. FIGS. 10C, 14) and, during adjustment and/or use of the locking pin 34, is configured to be non-rotatable therein. When the exemplary body 400 is inserted into the aligned locking pin holes 32 of the adjacent mats 26, the foot 410 is configured to be positioned at least partially below the lower, or second, mat 26b (e.g. FIGS. 10C, 14). If desired, after the locking pin 34 is in place, the recess 406 and head 423 of the retractor 420 may be covered in any suitable manner. For example, the recess 406 and head 423 of the retractor 420 may be covered with a removable cover 456. The removable cover 456 may have any suitable form, configuration construction and operation.

In this embodiment, the cover 456 is construed of rubber or plastic and is friction fit into the recess 406 and over the head 423 to at least substantially seal or prevent debris from entering the recess 406. In other embodiments, for example, the cover 456 may mechanically or otherwise engage the recess 406 and/or head 423 of the retractor 420 in any suitable manner.

Still referring to FIGS. 5A & E, to allow insertion of the illustrated locking pin 34 into the aligned locking pin holes 32 of adjacent mats 26, the exemplary foot 410 is initially positioned in at least one unlocked position. For example, the foot 410 in an unlocked position may be at least partially aligned with the body 400 (e.g. FIG. 5A), so the locking pin 34 can be inserted and removed from the aligned locking pin holes 32 of the adjacent mats 26. After the exemplary locking pin 34 is inserted into the aligned corresponding locking pin holes 32, the foot 410 is selectively moveable into at least one locked position (e.g. FIG. 9A-B). In at least one locked position, the exemplary foot 410 is positioned at least partially below the lower mat 26 (e.g. FIGS. 10C, 14), non-aligned with the body 400 (e.g. FIG. 9A-B) and non-movable up through the respective locking pin holes 32 of the aligned mats 26. While in at least one locked position, the exemplary foot 410 is selectively moveable upwardly (and downwardly) relative to the body 400 and the mats 26.

Still referring to FIGS. 5A-E, the foot 410 may be selectively moveable from an unlocked position into a locked position and then, while in one or more locked positions, selectively moveable, upwardly in the direction of the body 400 in any suitable manner. In this embodiment, the locking pin 34 includes an elongated retractor 420 that engages the foot 410 and assists in selectively moving the foot 410 between at least one unlocked position and at least one locked position and, when the foot 410 is in one or more locked positions, selectively moving it substantially linearly upwardly relative to the body 410 without substantially rotating it. As used throughout this specification and the appended claims, the terms "substantial", "substantially", "approximately", "generally" and variations thereof means and includes (i) completely, or 100%, of the referenced parameter, variable or value, and (ii) a range of values less than 100% based upon a desired or the typical, normal or expected degree of flexibility, variation or error for the referenced parameter, variable or value in the context of the particular embodiment or use thereof, such as, for example, 90-100%, 95-100% or 98-100%. For instance, when the movement of the exemplary foot 410 (e.g. FIG. 5A) of an exemplary locking pin 34 is described or claimed herein as "substantially linear" or a variation thereof, the movement of the foot 410 may be perfectly linear or partially linear. The foot 410 may, for example, rotate, reciprocate or experience some other movement while it is moving primarily linearly. For another example, the foot 410 in "substantially linear" movement may, in fact, alternate between movements—such as by rotating followed by linear movement, etc.

Figure 6:
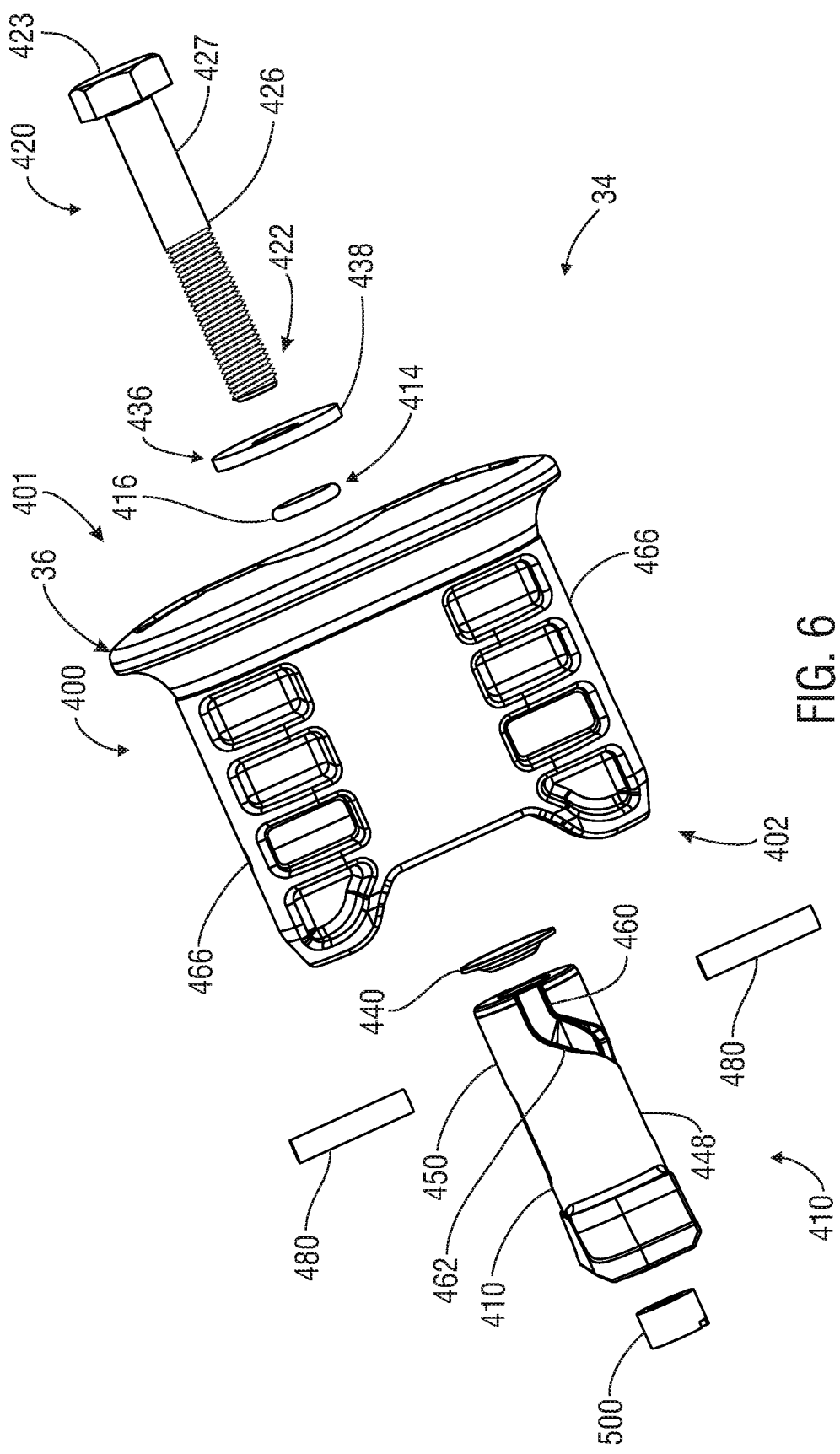
FIG. 6 is an assembly view of the exemplary locking pin of FIG. 5A.
Figure 13:
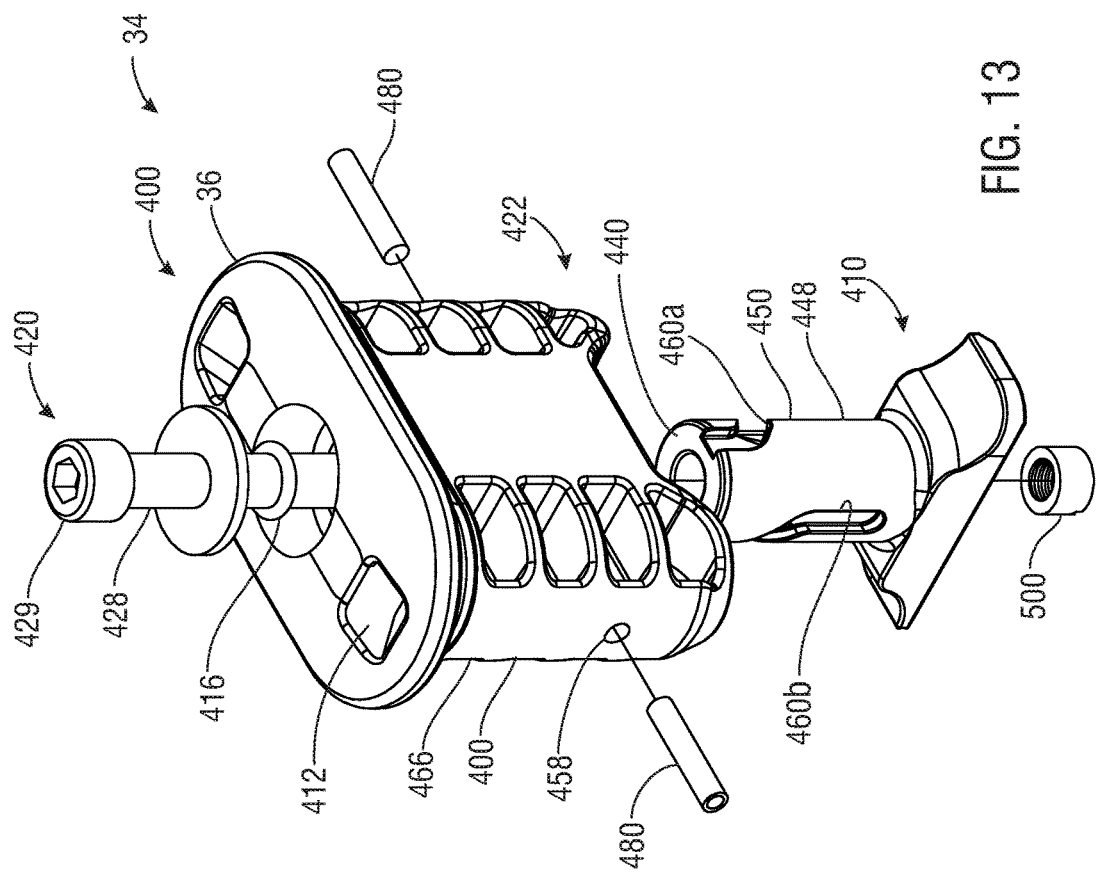
FIG. 13 is an exploded view of the exemplary locking pin of FIG. 5A with an embodiment of a retractor that is a socket head cap screw.

Still referring to FIGS. 5A-E, the retractor 420 may have any suitable form, construction, configuration and operation and may engage the foot 410 in any suitable manner. For example, the retractor 420 may be a rotatable drive bolt 426 (e.g. hexagonal head drive bolt 427, FIG. 6) or a socket head cap screw 429 (FIG. 13) that extends into the body 400 and engages the foot 410. In this example, the retractor 420 is insertable into the recess 406 formed into the upper end 401 of the body 400, extends down into the main bore 470 of the body 400, is rotatable relative to the body 400 and is at least partially threaded so that it threadably engages the foot 410. However, this particular configuration is not necessary in every embodiment. For example, the retractor 420 may engage the foot 410 without a threaded engagement, such as by mechanical connection (e.g. cotter pin, screw, etc.).

In this embodiment, the illustrated retractor 420 includes a head 423 that fits into the recess 406. If desired, the head 423 may rest upon the seat 404 formed in the body 400 or one or more intermediate components. For example, one or more springs 436, such as Bellville washers 438, may be positioned between the head 423 of the retractor 420 and the seat 404. The spring(s) 436 may provide continuous tension, or spring-like action, between the retractor 420 and the body 400, assist in maintaining a tight engagement therebetween during use of the locking pin 34 or other suitable purpose. In this example, a single Bellville washer 438, with its cone facing downwards, is sandwiched between the head 423 of the retractor 420 and the seat 404.

Also if desired, one or more seal members 414 may be sandwiched between the head 423 of the retractor 420 and the body 400, such as to provide a liquid seal at the top of the main bore 470 and prevent liquid from entering the bore 470 from above, to act as a friction device that tightens on the retractor 420 as the spring 436 compresses to assist in preventing vibration loosening during use of the locking pin 34, a combination thereof or other purpose. The seal member(s) 414 may have any desired form, configuration, construction and operation. In this example, a single O-ring seal 416 is sandwiched between the spring-like member 436 and the seat 610.

Referring now specifically to FIG. 5B, the retractor 420 may engage the foot 410 in any suitable manner. In this embodiment, the foot 410 includes an upright neck 450 that extends at least partially into the main bore 470 of the body 400 and is moveable up and down therein. The exemplary neck 450 includes a bore 452 that is at least partially threaded. The illustrated retractor 420 threadably engages the neck 450 of the foot 410 so that when the retractor 420 is rotated in one direction (e.g. clockwise), the foot 410 moves up the threads of the retractor 420, and when the retractor 420 is rotated in the opposite direction, the foot 410 moves down the threads of the retractor 420. In other words, with rotation of the exemplary retractor 420, the foot 410 is screwed upwardly ("moves threadably upwardly") and downwardly ("moves threadably downwardly") on the retractor 420.

In this embodiment, when the exemplary foot 410 is in an unlocked position and the retractor 420 is rotated, the foot 410 will rotate from an unlocked into a locked position relative to the mats 26. For example, three-four (or other desired number of) rotations (e.g. 1, 2, 5, 6 or more) of the illustrated retractor 420 may rotate the foot 410 approximately ninety degrees, or ¼ turn, until the foot is angularly oriented (e.g. perpendicular) relative to the body 400 (e.g. FIGS. 9A-B). It should be noted that in some embodiments, the foot 410 may simultaneously move upwardly towards to body 400 as it rotates, or may move in a substantially linear path toward the body 400 for a desired distance before rotating into a locked position. Furthermore, in various embodiments, the foot 410 may be rotatable into and out of more than one locked position, as desired.

After the exemplary foot 410 is in a locked position, subsequent rotation of the exemplary retractor 420 in the same direction will draw the foot 410 (still in one or more locked positions), in a substantially linear path closer to the body 400. In various scenarios, such substantial linear movement of the foot 410 towards the body 400 may, for example, tighten the connection of the mats 26 and/or other components. In other embodiments, the foot 410 may rotate while moving linearly or move in some other fashion as the distance between it and the body 400 decreases.

Still referring to FIG. 5B, to loosen and unlock the illustrated locking pin 34, the retractor 420 is rotated in the opposite direction (e.g. counterclockwise), moving the foot 410 away from the body 400 and from a locked to an unlocked position (e.g. aligned with the body 400). The retractor 420 may be rotated with any suitable mechanism, such as manually or with an automated mechanism, a wrench or other gripping device, a hex-head or other socket wrench, power-drill fitted with the appropriate socket or other suitable tool. As compared to various prior art mat locking pins, the retractor 420 of this embodiment has more turning action and the foot 410 can travel a greater distance relative to the body 400 of the locking pin 34, affording the pin 34 a longer reach.

If desired, the locking pin 34 may be configured to prevent the undesirable separation thereof. For example, at least one anchor 500 may be disposed at, or proximate to, the lower end 422 (e.g. FIG. 6) of the retractor 420 below the retractor's threaded engagement with the foot 410. The anchor 500 may have any suitable configuration, form, construction and operation. In this example, the anchor 500 is a stop collar, or metal ring, welded, bonded, crimped or otherwise rigidly connected to the lower end 422 of the retractor 420 and moveable in a lower, wide, portion 454 of the bore 452 of the neck 450 as the retractor 420 is rotated. The exemplary anchor (e.g. stop collar) 500 is restrained from separating from the foot 410 at the upper end of the wide bore portion 454 by a ledge 446. However, any other suitable component(s) or feature(s) may be used to prevent the undesirable separation of the retractor 420 and foot 410, such as a cotter pin or cross pin, wide section of the retractor 420, etc.

Still referring to FIG. 5B, if desired, one or more retainers 440 may be associated with the retractor 420 and/or foot 410 to assist in securing the position of the threadably engaged retractor 420 and foot 410 relative to the body 400, preventing the engaged retractor 420 and neck 450 of the foot 410 from being undesirably moved (e.g. pushed, slid, etc.) in unison in the bore 470 of the body 400, ensuring the retractor 420 and foot 410 are movable relative to the body 400 only by rotation of the retractor 420 or a combination thereof. The retainer 440 may have any suitable form, configuration and operation. In this embodiment, for example, the retainer 440 is a stop washer positioned around the retractor 420 in the bore 470 of the body 400 above the top of the neck 450 of the foot 410.

Now referring to FIGS. 5B & E, as the exemplary retractor 420 is rotated and the foot 410 concurrently threadably moves up or down the retractor 420, the position of the foot 410 relative to the body 400 may be established and/or controlled in any suitable manner. In this embodiment, the body 400 includes at least one internally disposed guide pin 480 that extends into the main bore 470 thereof and into one or more guide grooves 460 formed in the neck 450. The particular shape, or path, of the exemplary guide grooves 460 dictates the desired movement, positioning, orientation or a combination thereof of the foot 410 as it is drawn toward or away from the body 400. The guide pins 480 and guide groves 460 of this embodiment thus dictate the orientation of the foot 410 as the retractor 420 is rotated.

In the present embodiment, as the exemplary retractor 420 is selectively rotated and the foot 410 concurrently moves threadably up or down the retractor 420, the engagement of the guide grove(s) 460 with the associated guide pin(s) 480 (e.g. FIGS. 7A, 12A) will dictate the orientation of the foot 410 relative to the body 400. For example, as the illustrated retractor 420 is rotated in one direction (e.g. clockwise) from the start position (e.g. foot 410 unlocked, FIGS. 5A, 7A), the guide groove 460 is shaped to cause the foot 410 to rotate relative to the body 400 from at least one unlocked position to at least one locked position (e.g. FIG. 9A), and, thereafter, cause the foot 410 to remain one or more locked positions and move upwardly (e.g. FIGS. 7A-D, 12A-D) relative to the body 400 in the direction of the lower end 402 of the body 400 (e.g. FIGS. 11A-D).

The guide grove 460 may have any desired form, configuration, construction and operation. Referring to FIGS. 7A-D, the exemplary guide groove 460 is formed in the outer wall 448 of the neck 450. In this embodiment, two identical (symmetrically shaped) guide groves 460a, 460b are formed on opposite sides of the neck 450 (see also, FIG. 13). However, there may be any desired number of guide grooves 460 (e.g. 1, 2, 3, 4 etc.), which may be positioned as desired relative to the foot 410 and may have the same or different shapes and configurations.

Still referring to FIGS. 7A-D, each illustrated guide groove 460 includes at least first and second portions 462, 464. The exemplary first portion 462 includes a curved section that causes the foot 410 to rotate between at least one unlocked position (e.g. FIG. 5A) and at least one locked position (e.g. FIGS. 9A-B) as the retractor 420 is rotated in one direction (e.g. clockwise). For example, the first portion 462 may cause the foot 410 to move approximately ninety degrees (or ¼ turn) between an unlocked and locked position (or vice versa). The exemplary second portion 464 includes a substantially linear section that causes the foot 410 (while in at least one locked position) to move in a substantially linear path relative to the body 400 as the retractor 420 is further rotated in the same direction. The opposite rotation of the exemplary retractor 420 (e.g. counterclockwise) will cause the reverse order of orientation and movement of the foot 410 (e.g. away from the body 400 in a substantially linear path in at least one locked position then rotated into an unlocked position). However, the guide groove(s) 460 may have any other desired shape, configuration and operation.

It should be noted that the selective rotation of the exemplary retractor 420 may be stopped during the rotation of the foot 410, if desired. For example, the illustrated retractor of FIGS. 8A-B has been rotated only sufficiently to rotate the foot 410 approximately forty five degrees (or ⅛ turn) from an unlocked position (e.g. from an initial, full-reach position) to an intermediate (e.g. partial) locked, position. Such an intermediate locked position of the foot 410 may be desirable or sufficient in various scenarios, such as when the maximum reach (e.g. reach 430, FIG. 5B) of the locking pin 34 is desired, there is no need to shorten the distance between the foot 410 and the body 400, an obstruction or other circumstance is preventing the full ninety degree movement or positioning of the foot 410 or any other suitable reason.

Referring back to FIG. 5B, the guide pin 480 may likewise have any desired form, configuration, construction and operation. In this embodiment, each guide pin 480 may be a rod (e.g. metal) disposed at least partially in a substantially horizontally-oriented passageway 458 formed in the body 400. The illustrated guide pin 480 extends from the passageway 458 into the main bore 470 of the body 400 and into the corresponding guide groove(s) 460 formed in the neck 450 of the foot 410. If desired, the guide pin 480 may be secured in the passageway 458 so that, during use of the locking pin 34, it does not disengage from the guide groove 460. In some embodiments, it may be preferred that the guide pin 480 be stationary during use and operation of the locking pin 34 so that it generally does not move in any direction. For example, the guide pin 480 may be friction fit, glued or welded in the passageway 458. In other embodiments, it may be desirable to allow the guide pin 480 to rotate within the passageway 458 or move in some other manner. If desired, the guide pin 480 may be retrievable from the passageway 458, such as by being threadably engaged with the passageway 458, or including a portion or component that may be engaged, or grabbed, and removed from the passageway 458 or otherwise with any suitable mechanism.

The passageway 458 may have any suitable form, configuration, construction and operation. The illustrated passageway 458 is a hole bored into one of the (opposing) sides 466 of the body 400 and which communicates with the main bore 470. In this embodiment, the body 400 includes first and second substantially horizontally-oriented passageways 458 formed therein on opposite sides 466 thereof and first and second guide pins 480 disposed therein and engageable with the first and second guide grooves 460a, 460b of the neck 450, respectively. However, there may be any desired number of passageways 458 and guide pins 480 (e.g. 1, 2, 3, 4 etc.) disposed in any desired configuration. Furthermore, in some embodiments, the guide pin 480 may not be disposed in a substantially horizontally-oriented passageway 458, but integrally formed, or otherwise provided, within the body 400. Thus, the present disclosure is not limited to the use of the substantially horizontally-oriented passageway(s) 458 to retain the guide pin(s) 480.

Figure 9B:
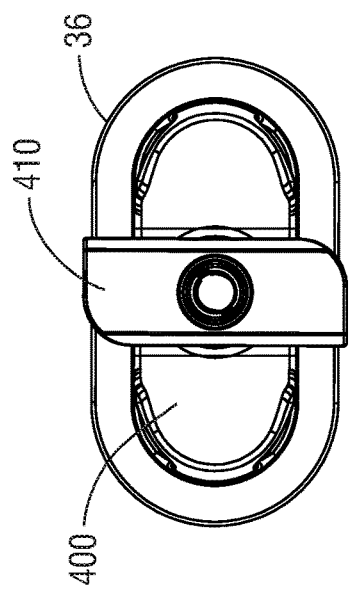
FIG. 9B is a bottom view of the exemplary locking pin of FIG. 9A.
Figure 9A:
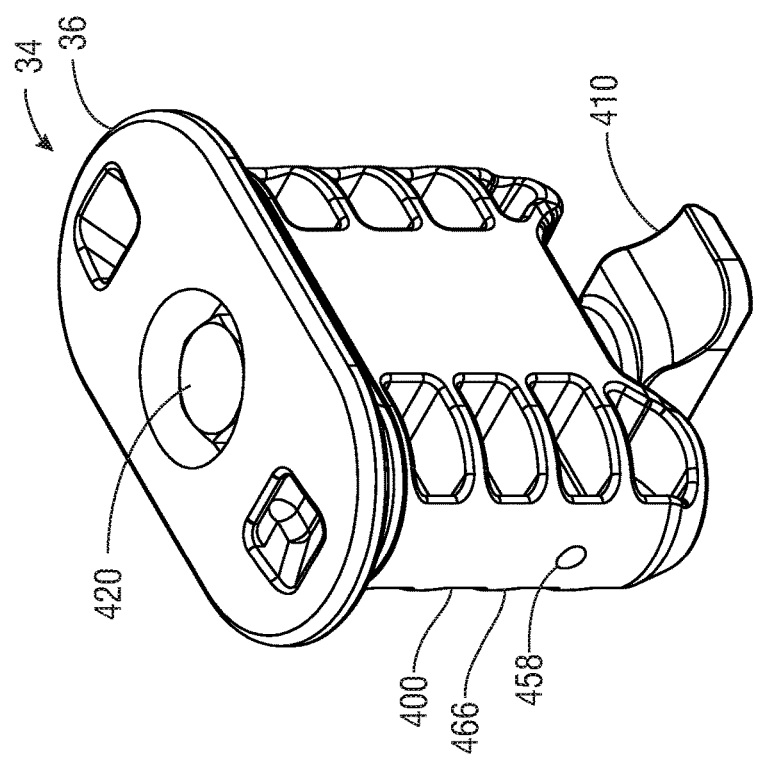
FIG. 9A is a perspective view of the exemplary locking pin of FIG. 5A showing the exemplary foot in a locked position.

In the present embodiment, FIGS. 5A-E show the exemplary adjustable locking pin 34 in a full-reach position with its exemplary foot 410 in a fully-extended and unlocked position; FIGS. 7A-D show the exemplary foot 410 in a fully-extended and unlocked position; FIGS. 8A-B show the exemplary foot 410 in an intermediate locked position; FIGS. 9A-B show the exemplary foot 410 in a locked position; FIGS. 10A-C and 14 each show the exemplary locking pin 34 in a partial-reach position and its exemplary foot 410 in a partial-reach and locked position; FIGS. 11A-D show the exemplary locking pin 34 in a full-tight position and its exemplary foot 410 in a fully-retracted and locked position; and FIGS. 12A-D show the exemplary foot 410 in an a fully-retracted and locked position.

Preferred embodiments of the present disclosure thus offer advantages over the prior art and are well adapted to carry out one or more of the objects of this disclosure. However, the present invention does not require each of the components and acts described above and is in no way limited to the above-described embodiments or methods of operation. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein, the appended drawings and claims.

The methods that may be described above or claimed herein and any other methods which may fall within the scope of the appended claims can be performed in any desired suitable order and are not necessarily limited to any sequence described herein or as may be listed in the appended claims. Further, the methods of the present invention do not necessarily require use of the particular embodiments shown and described herein, but are equally applicable with any other suitable structure, form and configuration of components.

While exemplary embodiments of the invention have been shown and described, many variations, modifications and/or changes of the system, apparatus and methods of the present invention, such as in the components, details of construction and operation, arrangement of parts and/or methods of use, are possible, contemplated by the patent applicant(s), within the scope of any appended claims, and may be made and used by one of ordinary skill in the art without departing from the spirit or teachings of the invention and scope of this disclosure and any appended claims. Thus, all matter herein set forth or shown in the accompanying drawings should be interpreted as illustrative, and the scope of the disclosure and any appended claims should not be limited to the embodiments described and shown herein.

The invention claimed is:

1. A locking pin for connecting at least first and second adjacent mats of a support surface, the first mat being configured to at least partially overlap the second mat so that a locking pin hole extending through the first mat aligns at least partially over a locking pin hole extending through the second mat, the locking pin comprising;
    a body having a main bore extending therethrough from an upper end to a lower end thereof, said body being configured to be inserted and extend into the aligned locking pin holes of the first and second mats;
    a foot operatively connected to said body, being positionable at least partially below said lower end of said body and the second mat when said body is inserted into the aligned locking pin holes of the first and second mats and including an elongated neck extending at least partially upwardly into said main bore of said body, said elongated neck including at least one guide groove formed therein, said foot being rotatable from at least one unlocked position to at least one locked position after said body and said foot are inserted into the aligned locking pin holes of the first and second mats, said foot in said at least one unlocked position being movable up and down with said body through the aligned locking pin holes of the first and second mats, said foot in said at least one locked position being positioned at least partially below the second mat and non-movable up through the respective locking pin holes of the first and second mats, wherein said foot in at least one said locked position is selectively moveable upwardly relative to said body closer to said lower end of said body;
    an elongated retractor extendable down into said main bore of said body from said upper end of said body and being rotatably moveable therein and relative to said body, said retractor being threadably engaged with said neck of said foot, whereby as said elongated retractor is rotated in one direction, said foot moves threadably upwardly on said elongated retractor and when said elongated retractor is rotated in the opposite direction, said foot moves threadably downwardly on said elongated retractor, said elongated retractor being configured to assist in selectively moving said foot between said at least one unlocked position and said at least one locked position and, when said foot is in at least one said locked position, selectively moving said foot upwardly relative to said body closer to said lower end of said body; and
    at least one guide pin disposed within said body and extending at least partially into at least one said guide groove of said elongated neck of said foot, wherein as said elongated retractor is rotated when said foot is in at least one said locked position, the engagement of said at least one guide groove and said at least one associated guide pin assists in causing said foot, in said at least one locked position, to move upwardly and downwardly relative to said body.

2. The locking pin of claim 1 wherein said elongated retractor is at least one among a hex-head drive bolt and a socket-head cap screw.

3. The locking pin of claim 1 wherein said elongated retractor is configured to assist in selectively moving said foot in said at least one locked position upwardly relative to said body closer to said lower end of said body without causing the rotation of said foot relative to said body.

4. The locking pin of claim 1 wherein said body includes a cut-out formed in the upper end thereof and in communication with said main bore, said body further including a seat disposed between said cut-out and said main bore, wherein said elongated retractor has upper and lower ends and a head disposed at said upper end thereof, said head being configured to rest upon or near said seat of said body, further including at least one spring sandwiched between said head of said elongated retractor and said seat and configured to assist in maintaining a tight engagement between said elongated retractor and said body during use of the locking pin.

5. The locking pin of claim 4 further including at least one seal disposed between said at least one spring and said seat of said body and configured to grip said elongated retractor and assist in preventing loosening of said elongated retractor from said body during use of the locking pin.

6. The locking pin of claim 1 further including at least one retainer extending at least partially around said elongated retractor in said main bore of said body and above said foot, said at least one retainer being configured to assist in substantially centering said engaged elongated retractor and foot in said main bore of said body.

7. The locking pin of claim 6 wherein said at least one retainer is a stop washer extending around said retractor in said main bore of said body above said elongated neck of said foot.

8. The locking pin of claim 1 wherein as said elongated retractor is rotated in one direction, said at least one guide groove is shaped to cause said foot to rotate relative to said body from said at least one unlocked position to said at least one locked position and thereafter cause said foot to remain in said at least one locked position and move substantially linearly upwardly relative to said body in the direction of said lower end of said body.

9. The locking pin of claim 1 wherein each said guide groove includes at least a first portion and a second portion, said first portion including a curved section that causes said foot to rotate between at least one said unlocked position and at least one said locked position and said second portion including a substantially linear section that causes said foot in at least one said locked position to move in a substantially linear path relative to said body as said elongated retractor is rotated in one direction.

10. The locking pin of claim 1 wherein said main bore of said body extends substantially vertically therethrough, further wherein said body includes at least one substantially horizontally-oriented passageway formed therein and in communication with said main bore, further wherein said at least one guide pin is at least partially disposed and fixed in a stationary position within said at least one substantially horizontally-oriented passageway.

11. The locking pin of claim 10 wherein said body includes first and second opposing sides, at least first and second said substantially horizontally-oriented passageways extending into said body from said first and second opposing sides, respectively, and first and second said guide pins disposed within said first and second said substantially horizontally-oriented passageways, respectively, further wherein said outer wall of said neck includes first and second said guide grooves on opposite sides thereof, whereby said first guide pin engages said first guide groove and said second guide pin engages said second guide groove.

12. The locking pin of claim 1 further including at least one anchor associated with said elongated retractor and configured to couple said elongated retractor to said foot.

13. The locking pin of claim 12 wherein said at least one anchor is rigidly coupled to said elongated retractor and configured to prevent said elongated retractor and said foot from becoming disconnected from one another.

14. The locking pin of claim 12 wherein said foot includes an at least partially threaded bore extending therethrough from an upper end to a lower end thereof, said bore having at least upper and lower portions, each said upper and lower portion having a width, wherein the width of said lower portion is greater than the width of said upper portion and forms a ledge between said upper and lower portions, said elongated retractor being disposed at least partially within said bore of said foot, wherein said elongated retractor has upper and lower ends, further wherein said at least one anchor includes at least one stop collar coupled to said lower end of said elongated retractor, moveable with said retractor, configured to move up and down within said lower portion of said bore of said foot and prevented from moving within said upper portion of said bore of said foot.

15. The locking pin of claim 14 wherein said stop collar is rigidly coupled to said lower end of said retractor.

16. The locking pin of claim 1 wherein said foot has a lower end and includes at least two protrusions extending at least partially laterally outwardly therefrom, wherein when said foot is in said at least one unlocked position, said protrusions are moveable up and down through the locking pin holes of the first and second mats and when said foot is in said locked position, each said protrusion extends at least partially below a different respective portion of the second mat, is engageable therewith and configured to tighten the first and second mats together as said foot, in at least one said locked position, is moved upwardly.

17. The locking pin of claim 16 wherein when said foot is in said locked position, each respective pair of said protrusions extends laterally outwardly from said foot on opposite sides of the locking pin holes of the first and second mats.

18. The locking pin of claim 1 further including at least one seal disposed between said elongated retractor and said body proximate to the upper end of said main bore of said body and configured to provide a liquid-tight seal at the upper end of said main bore and prevent liquid from entering said main bore from above.

19. A method of releasably connecting at least first and second mats with the use of the locking pin of claim 1, the first mat at least partially overlapping the second mat so that a locking pin hole in the first mat at least partially aligns over a locking pin hole in the second mat, the method comprising:
 inserting the locking pin into the at least partially aligned locking pin holes of the first and second mats with the at least one foot in an unlocked position;
 rotating the retractor to rotate the foot into at least one locked position so that the foot is positioned below the second mat and is not movable up through the respective locking pin holes of the first and second mats; and
 rotating the retractor to move the foot, in at least one locked position, upwardly relative to the body and the first and second mats to move the foot closer to the lower end of the body while the foot remains in at least one locked position.

20. The method of claim 19 wherein the locking pin includes at least one retainer disposed around the retractor in the main bore of the body and above the foot, further including
 the foot in the at least one locked position engaging the second mat, and
 the at least one retainer assisting in substantially centering the retractor and the foot in the main bore of the body.

\* \* \* \* \*